UNITED STATES PATENT OFFICE.

EUGEN BERGMANN, OF OHLAU, GERMANY.

METHOD OF PRODUCING DICALCIUM PHOSPHATE.

No. 852,372.  Specification of Letters Patent.  Patented April 30, 1907.

Original application filed October 13, 1903, Serial No. 176,873. Divided and this application filed May 11, 1904. Serial No. 207,423.

*To all whom it may concern:*

Be it known that I, EUGEN BERGMANN, manufacturer, a citizen of the German Empire, residing at Ohlau, Silesia, Germany, have invented a new or Improved Method of Producing Dicalcium Phosphate, of which the following is a specification.

This invention relates to a method of producing dicalcium phosphate by using the known reaction whereby tricalcium phosphate is dissolved in cold aqueous sulfurous acid and the sulfurous acid is then eliminated from such solution by boiling.

$$Ca_3(PO_4)_2 + 4SO_2 + 4H_2O = CaH_4(PO_4)_2 + 2Ca(HSO_3)_2 =$$
by boiling

Precipitate
$$\overline{2CaHPO_4 + CaSO_3} + 3SO_2 + 3H_2O.$$

(Compare *Wagner's Jahresbericht* 1882, page 389. Investigations by Rotondi). The dicalcium phosphate obtained by such reaction has the disadvantage that the precipitate contains calcium sulfite, which appears to render its suitability as an ingredient for cattle food doubtful, as no investigations have been made on the action of sulfites on the stomachs of animals.

In order to obtain a dicalcium phosphate free from the sulfite of calcium, this invention provides an addition of acid (for instance phosphoric acid, hydrochloric acid, sulfuric acid or bisulfate of sodium having an analogous action) to the aforesaid solution of tri-phosphate of lime or to the precipitate obtained by its being boiled. For instance:

*a*) Sulfuric acid:

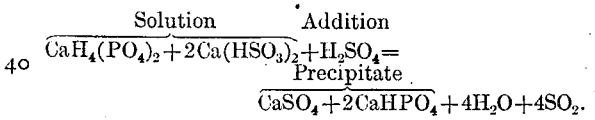

*b*) Hydrochloric acid:

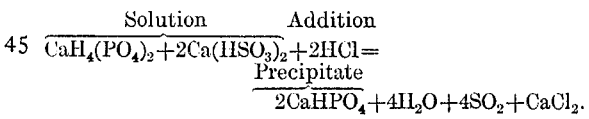

*c*) Phosphoric acid:

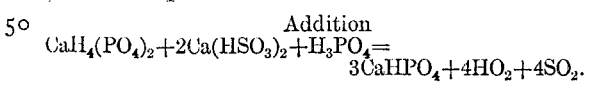

The sulfurous acid must be expelled by boiling, as in the cold, the latter would cause the reformation of monocalcium phosphate and calcium bisulfite.

$$2CaHPO_4 + 2SO_2 + 2H_2O = CaH_4(PO_4)_2 + Ca(HSO_3)_2.$$

This process is distinguished from the known method of producing calcium phosphate from a solution of tricalcium phosphate in cold aqueous sulfurous acid by the fact that, as stated, a precipitate free from calcium sulfite results. The other known methods whereby dicalcium phosphate is precipitated by milk of lime, from a solution of phosphate of lime in hydrochloric acid (as in the maceration of bones) or from a solution of mineral phosphate in acids, are attended with the disadvantage that the acids used as solvents are entirely lost and that, further, the use of milk of lime becomes necessary. In the present invention however the expense of lime as a means of precipitating is done away with. By these means dicalcium phosphate can be produced from a solution of tricalcium phosphate in cold hydrated sulfurous acid or from the precipitate obtained from such solution by boiling, the distinctive feature whereof is that a mineral acid is added to the reaction mixture and the sulfurous acid is then eliminated by boiling.

Having now particularly described and ascertained the nature of my invention and in what manner the same is performed, I declare that what I claim is:

1. In the process of manufacturing dicalcium phosphate by treating tricalcium phosphate with aqueous sulfurous acid and eliminating the sulfurous acid by boiling, the improvement which consists in decomposing the calcium sulfite by adding a mineral acid.

2. The process of manufacturing dicalcium phosphate, which consists of boiling a solution of tricalcium phosphate in aqueous sulfurous acid forming a precipitate containing calcium sulfite, adding a mineral acid to the precipitate and subsequently boiling this mixture for the purpose of obtaining a precipitate free from calcium sulfite.

In testimony whereof I have signed this specification in the presence of two subscribing witnesses.

EUGEN BERGMANN.

Witnesses:
 A. W. MAN,
 ALBERT SOHENK.